United States Patent
Shokri Razaghi et al.

(10) Patent No.: US 10,251,180 B2
(45) Date of Patent: Apr. 2, 2019

(54) GRID DESIGN FOR INTRODUCING GAPS IN TRANSMISSION FOR DL NB-IOT

(71) Applicant: Telefonaktiebolaget LM Ericsson (publ), Stockholm (SE)

(72) Inventors: Hazhir Shokri Razaghi, Kista (SE); Ansuman Adhikary, Santa Clara, CA (US); Johan Bergman, Stockholm (SE); Yufei Blankenship, Kildeer, IL (US); Asbjörn Grövlen, Stockholm (SE); Xingqin Lin, San Jose, CA (US); Yutao Sui, Solna (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 14 days.

(21) Appl. No.: 15/524,798

(22) PCT Filed: Mar. 14, 2017

(86) PCT No.: PCT/SE2017/050248
§ 371 (c)(1),
(2) Date: May 5, 2017

(87) PCT Pub. No.: WO2017/160213
PCT Pub. Date: Sep. 21, 2017

(65) Prior Publication Data
US 2018/0077697 A1 Mar. 15, 2018

Related U.S. Application Data

(60) Provisional application No. 62/309,304, filed on Mar. 16, 2016.

(51) Int. Cl.
*H04W 72/04* (2009.01)
*H04L 5/00* (2006.01)
*H04L 29/08* (2006.01)
(Continued)

(52) U.S. Cl.
CPC ......... *H04W 72/048* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS

2015/0304854 A1* 10/2015 Xu .................. H04W 16/14
370/280
2015/0365976 A1* 12/2015 Lee .................. H04W 74/0833
455/422.1
(Continued)

OTHER PUBLICATIONS

3GPP TSG RAN WG1 Meeting #84; St. Julian's, Malta; Source: WI rapporteur (Ericsson); Title: RAN1 agreements for Rel-13 eMTC sorted and edited by topic (R1-161546)—Feb. 15-19, 2016.
(Continued)

*Primary Examiner* — Hong S Cho
(74) *Attorney, Agent, or Firm* — Baker Botts, LLP

(57) ABSTRACT

A method in a network node includes communicating, over a narrowband Internet of Things downlink, a first message to a first wireless device during repetition periods of at least a first time frame and a second time frame of a plurality of time frames of a transmission time of a narrowband physical downlink control channel (NB-PDCCH) or a narrowband physical downlink shared channel (NB-PDSCH). Each time frame of the plurality of time frames includes a repetition period and a gap. The method also includes communicating a second message to a second wireless device during a gap of the first time frame.

36 Claims, 12 Drawing Sheets

(51) Int. Cl.
*H04W 72/14* (2009.01)
*H04W 4/70* (2018.01)

(52) U.S. Cl.
CPC ........... *H04L 67/12* (2013.01); *H04W 72/042* (2013.01); *H04W 72/0446* (2013.01); *H04W 72/14* (2013.01); *H04W 4/70* (2018.02)

(56) References Cited

U.S. PATENT DOCUMENTS

2017/0181135 A1* 6/2017 Chen .................... H04L 5/0048
2017/0201932 A1* 7/2017 Yeh ...................... H04W 48/12
2017/0289973 A1* 10/2017 Yang ..................... H04L 27/26

OTHER PUBLICATIONS

3GPP TSG RAN WG1 Meeting #84bis; Busan, South Korea; Source: MCC Support; Title: Final Report of 3GPP TSG RAN WG1 #84 v2.0.0 (St. Julian's, Malta, Feb. 15-19, 2016) (R1-163406)—Apr. 11-15, 2016.

PCT Written Opinion of the International Searching Authority for International application No. PCT/SE2017/050248—dated Jun. 22, 2017.

3GPP TSG-RAN1#84; St. Julian's, Malta; Source: Ericsson; Title: NB-IoT-Design Considerations for NB-PDSCH (R1-160264)—Feb. 15-19, 2016.

PCT International Search Report for International application No. PCT/SE2017/050248—dated Jun. 22, 2017.

3GPP TSG RAN WG1 Meeting #84; St. Julian's, Malta; Source: ZTE; Title: Remaining Issues on NB-PDCCH Design NB-IoT (R1-160467)—Feb. 15-19, 2016.

3GPP TSG RAN WG1 Meeting #84; St. Julian's, Malta; Source: Sony; Title: Consideration on NB-PDCCH for NB-IoT (R1-160669)—Feb. 15-19, 2016.

* cited by examiner

GRID DESIGN FOR INTRODUCING GAPS IN TRANSMISSION FOR DL NB-IOT

PRIORITY

This nonprovisional application is a U.S. National Stage Filing under 35 U.S.C. § 371 of International Patent Application Serial No. PCT/SE2017/050248 filed Mar. 14, 2017, and entitled "Grid Design For Introducing Gaps In Transmission For DL NB-IOT" which claims priority to U.S. Provisional Patent Application No. 62/309,304 filed Mar. 16, 2016, both of which are hereby incorporated by reference in their entirety.

TECHNICAL FIELD

The present disclosure relates generally to narrowband communications in an Internet of Things network.

BACKGROUND

To support machine type communication, which is the radio infrastructure, to realize the Internet of Things, two work items named Release 13 Long Term Evolution (LTE) Machine-type communication (MTC) and Narrowband Internet of Things (NB-IoT) have been introduced within 3rd Generation Partnership Project (3GPP). For both Release 13 LTE MTC and NB-IoT, the main solution to reach user equipment (UE) that is in a bad or extreme coverage area is to repeat transmissions over data and control channels.

SUMMARY

Repeat transmissions to reach UEs in bad or extreme coverage could take up to hundreds or even thousands of milliseconds. In the case of Release 13 LTE MTC, the available bandwidth is 6 physical resource blocks (PRB) and for the extreme coverage case, the whole bandwidth is assigned to one UE and one channel, which might cause delay in transmission of other UEs. However, the enhanced Node B (eNB) can schedule up to 16 different MTC carriers at the same time within the whole bandwidth of the system, in this case 20 MHz, as described in RAN1 Chairman's Notes, 3GPP TSG RAN WG1 Metting #84, St. Julian's, Malta, Feb. 15-19, 2016.

Compared to this, NB-IoT can only have 180 kHz bandwidth within one carrier, which equals to 1 PRB in LTE terms. It may not be possible to schedule extra carriers especially in the case where the deployment of NB-IoT is in the LTE guard-band or stand-alone case. Based on this fact, it is agreed that for NB-IoT downlink, control and data channels, e.g., Narrowband physical downlink control channel (NB-PDCCH) and Narrowband physical downlink shared channel (NB-PDSCH), are only multiplexed in time division multiplexing (TDM) fashion as described in R1-161546, "RAN1 Agreements for Rel-13 eMTC Sorted and Edited by Topic," RAN1 #84, February 2016.

Further, if a UE is in bad coverage, then it could delay transmissions to other UEs in good coverage. For example, to reach the UE in bad coverage, it could take hundreds or thousands of repeated transmissions of one message (whether through the control channel or the shared channel) before the UE receives the message and acknowledges it. During the time these repeated transmissions are being made, messages intended for UEs in good coverage and messages communicated by UEs in good coverage may be blocked and/or delayed. As an example, a UE in good coverage may need to wait hundreds of milliseconds to be able to transmit its data or signaling when repeated transmissions are being made to a UE in bad coverage on the same network. Therefore, there exists a problem with scheduling transmissions to different UEs with different coverage levels (e.g., a different number of repeated transmissions needed to reach the UEs) for NB-IoT in terms of delays in the transmission.

This disclosure contemplates a network node and/or UE that includes various components and/or that perform certain processes to address some or all of the issues described above. The network node may divide a transmission time of a narrowband physical downlink control channel (NB-PDCCH) or a narrowband physical downlink shared channel (NB-PDSCH) into a repetition period and a non-blocking period. The repetition period may be used for transmission to a UE in bad or low coverage, while the non-blocking period may be used for transmission to a UE in better coverage. For example, the repetition period may be used to transmit messages to a UE that needs hundreds or thousands of repetitions in order to be reached while the non-blocking period may be used to transmit messages to a UE that does not need as many repetitions (if any at all) in order to be reached. By separating transmission periods to UEs in low or bad coverage from transmission periods to UEs in better coverage, it is possible to reduce delays and/or avoid blocking of transmissions to UEs in better coverage caused by repeated transmissions to UEs in low or bad coverage. In this manner, the system may avoid stalling or delaying transmissions to UEs in better coverage.

According to one embodiment, a method in a network node includes communicating, over a narrowband Internet of Things downlink, a first message to a first wireless device during repetition periods of at least a first time frame and a second time frame of a plurality of time frames of a transmission time of a narrowband physical downlink control channel (NB-PDCCH) or a narrowband physical downlink shared channel (NB-PDSCH). Each time frame of the plurality of time frames includes a repetition period and a gap. The method also includes communicating a second message to a second wireless device during a gap of the first time frame. By performing this method, delays in communicating the second message and/or blocking of the second message caused by repeated transmissions of the first message may be avoided and/or reduced.

According to another embodiment, a network node includes a memory and processing circuitry. The processing circuitry communicates a first message to a first wireless device during repetition periods of at least a first time frame and a second time frame of a plurality of time frames of a transmission time of a narrowband physical downlink control channel (NB-PDCCH) or a narrowband physical downlink shared channel (NB-PDSCH). Each time frame of the plurality of time frames includes a repetition period and a gap. The processing circuitry is also configured to communicate a second message to a second wireless device during a gap of the first time frame. In this manner, the network node reduces delays in communicating the second message and/or avoids blocking the second message caused by repeated transmissions of the first message.

According to yet another embodiment, a wireless device includes a memory and processing circuitry. The processing circuitry is configured to receive a configuration indicating a subframe in which a communication over a narrowband physical downlink control channel (NB-PDCCH) is scheduled to be communicated. The processing circuitry is further configured to receive the communication over the NB-PDCCH in the subframe indicated by the configuration and to decode the communication. In this manner, the wireless device may avoid blocking or delaying of messages intended for the wireless device and/or of transmissions made by the wireless device.

According to another embodiment, a method in a wireless device includes receiving, over a narrowband Internet of Things downlink, a configuration indicating a subframe in which a communication over a narrowband physical downlink control channel (NB-PDCCH) is scheduled to be communicated. The method also includes receiving the communication over the NB-PDCCH in the subframe indicated by the configuration and decoding the communication. By performing this method, the wireless device may avoid blocking or delaying of messages intended for the wireless device and/or of transmissions made by the wireless device.

Certain embodiments may provide one or more technical advantages. For example, one embodiment avoids blocking of UEs with no or few repetitions in downlink transmission of NB-IoT while there are a large number of repetitions of the data and control channels caused by UEs in bad or extreme coverage. Another embodiment avoids blocking of control signals by aligning scheduled transmission times in a grid with the possible starting subframe structure for NB-PDCCH search space design. Yet another technical advantage of an embodiment maintains usage efficiency of downlink resources. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Both data and control information for downlink transmission of Release 13 NB-IoT are multiplexed using a TDM approach. Thus, it is not possible to transmit data and control information at the same time. Also, in order to communicate with UEs with low signal to noise ratio (SNR), which may be due to high coupling loss, eNBs repeatedly transmit each data or control channel (aka NB-PDSCH and NB-PDCCH) on a subframe basis. These repetitions might take up to hundreds or thousands of subframes for each transmission occasion. However, it is expected that most of the UEs in the system are performing within normal SNR range which needs no or at most a few repetitions.

If a UE is in a bad or extreme coverage area, which results in hundreds or thousands of repetitions, and if consecutive subframes are used for repetitions, other UEs, which only need one or a few subframes to receive their data or control information, can be effectively blocked. This causes delays in the reception of PDCCH (physical downlink control channel)/PDSCH (physical downlink shared channel) for hundreds or thousands of milliseconds. One solution to this problem is to introduce discontinuities (also referred to as gaps) during the transmission to UEs in bad or extreme coverage areas. Within these gaps, UEs with normal coverage can be scheduled to receive their data and control channels. The duration and occurrence frequency of these gaps should be designed such that UEs in normal coverage would not be blocked, UEs with lots of repetitions are not excessively delayed, and the resource allocation among UEs is efficient so that any waste of resources caused by the gaps is minimized.

Figure 1:
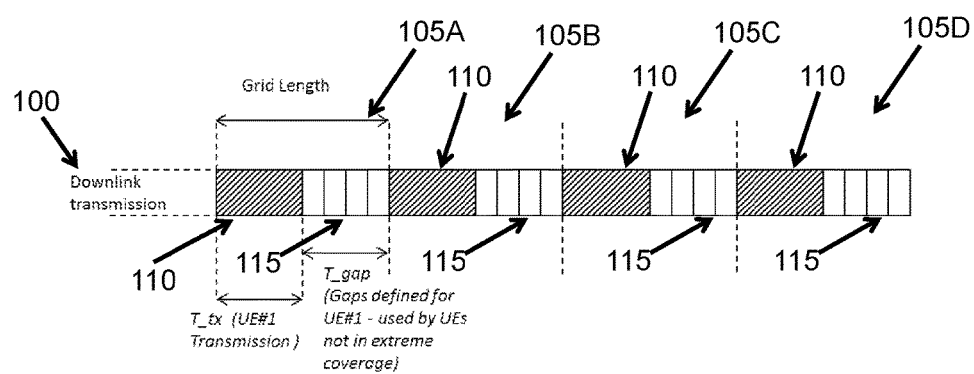
FIG. 1 illustrates an example grid design for introducing gaps in transmission for one UE in extreme coverage, in accordance with certain embodiments.
Figure 2:
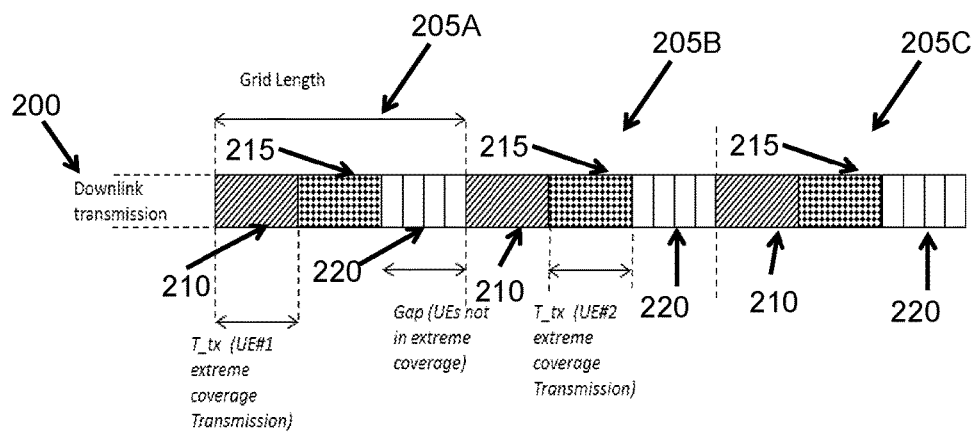
FIG. 2 illustrates an example grid structure for scheduling more than one UE in extreme coverage, in accordance with certain embodiments.
Figure 3:
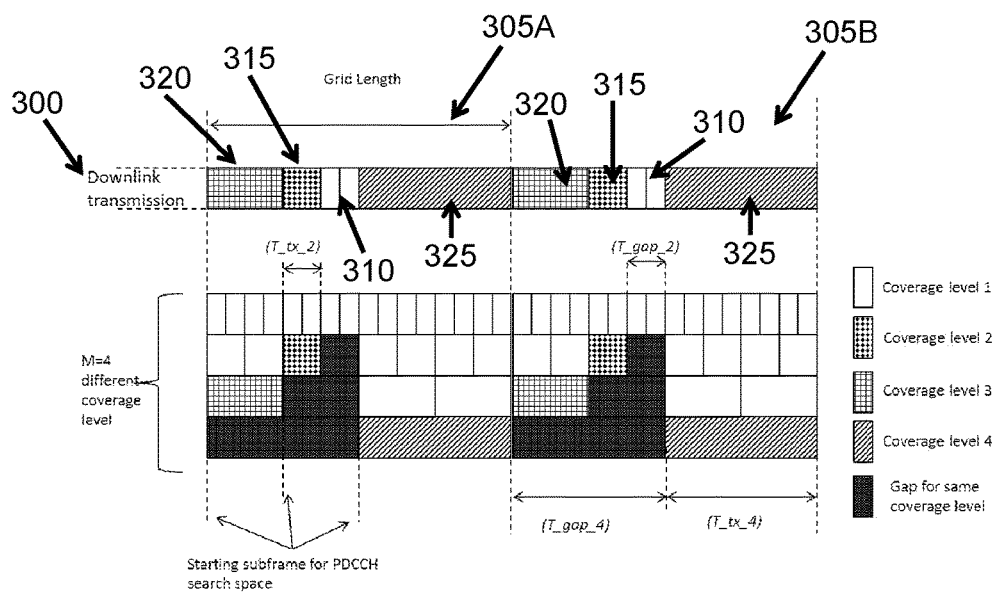
FIG. 3 illustrates an example grid structure for more than one coverage level, in accordance with certain embodiments.

Generally, this disclosure contemplates including transmission gaps between the repetitions for each coverage level so that, in case a UE needs large number of repetitions compared to other UEs, transmission to the UEs that require no or a few number of repetitions is not blocked and delayed for hundreds or thousands of subframes. In one embodiment, downlink transmission time is divided into a number of grids, which may be similar or identical in structure. Each grid includes gaps in transmission for each coverage level, as shown in FIGS. 1-3.

This disclosure contemplates a network node that divides a transmission time of an NB-IoT downlink channel into a plurality of time frames. An example transmission time 100 is shown in FIG. 1. Each time frame (also referred to as a grid 105A, 105B, 105C, 105D) is then further divided into transmission periods. For a first time frame 105A, during a first transmission period (also referred to as a repetition period 110), the network transmits to a first UE in a bad or extreme coverage area. During repetition period 110, the network node may repeatedly transmit to the first UE. During a second transmission period (also referred to as a non-blocking period 115 or gap), the network transmits to a second UE in good coverage, where repetitions are not anticipated. Repeat transmissions to the first UE can occur during repetition period(s) 110 of subsequent time frame(s) or grid(s) 105B, 105C, 105D, and the non-blocking period(s) 115 of the subsequent time frame(s) or grid(s) 105B, 105C, 105D can be used to transmit to other UEs in good coverage areas. For example, for a second time frame 105B (which could be a time frame immediately following the first time frame), during the repetition period 110, the network repeats the transmission to the first UE. Then, during the non-blocking period 115 (or gap) of the second time frame 105B, the network transmits to a third UE in a good coverage area. As shown in these examples, because the second and third UEs are in good coverage areas, the network can communicate with the second and third UEs without repeating transmissions. As a result, the network schedules transmissions to the second and third UEs during the non-blocking periods 115. Meanwhile, because the first UE is in a bad coverage area, the network repeats transmissions to the first UE in order to reach the first UE. As a result, the network schedules transmissions (and repeat transmissions) to the first UE during the repetition periods 110. In this manner, transmissions to UEs in good coverage areas are not blocked by repeated transmissions to UEs in bad or extreme coverage areas.

Further, a threshold (R_tx_thresh) per coverage level is used to set each coverage level. For example, R_tx_thresh may be a threshold for the number of repeated transmissions it takes to reach a UE (e.g., the number of repeated transmissions that are made before the UE acknowledges the transmission). Depending on the number of repeated transmissions, a network node may assign a UE to a particular coverage level. Each R_tx_thresh may be measured in the number of subframes. Specifying the threshold is not the only way to determine a UE's coverage level, and other criteria could be used as well. If the number of repetitions for one specific coverage level is satisfied, the whole transmission will be divided into different parts with length T_tx and sent with gaps with length T_gap between each part. FIG. 1 shows this concept where the whole transmission 100 for a UE in extreme coverage is divided into four parts 110 with length T_tx and the transmission of each part 110 is followed by a gap 115 of the same length. During the gap 115, no transmission is scheduled for the same or any other UEs in extreme coverage. This process is applicable to both PDSCH and PDCCH channels. The grids 105 are repeated periodically as shown in the FIG. 1.

If there are some invalid subframes inside the grids 105 in which there cannot be PDSCH or PDCCH transmission, the invalid subframes will be ignored and will not be taken into account for counting the number of subframes within the gaps 115 or transmission parts 110. This disclosure contemplates different ways to handle invalid subframes. For example, the grid 105 is unaffected by the invalid subframes except that no transmission takes place in the invalid subframes. As another example, the invalid subframes are inserted in the grid 105 in such a way that the grid 105 still contains the same number of valid subframes as before the insertion of the invalid subframe. As a result, the grid 105 becomes longer.

Once the parts for the current transmission of PDSCH/PDCCH of extreme coverage UE are sent, another extreme coverage transmission can be scheduled for the same or another UE. PDSCH and PDCCH for UEs are scheduled based on grid 105 structure. If there is no UE in extreme coverage level that needs to receive data or control in downlink, the whole grid 105 can be used for the data or control reception for other UEs. Meanwhile, if there arrives any information that is required to be transmitted for UEs in extreme coverage, the transmission should be delayed until the next grid 105.

The choice of the R_tx_thresh, T_tx, and T_gap depends on the target delay that can be tolerated by UEs with no or small number of repetitions and also depends on the extra delays that can be imposed on the UEs that have extreme number of repetitions. Also, percentage of UEs with different coverage levels in the network can be taken into consideration.

Although this example uses only two coverage levels (good vs. bad coverage area), this disclosure contemplates the network dividing a grid 105A, 105B, 105C, 105D to include any number of repetition periods 110 and non-blocking periods 115 to accommodate any number of coverage levels. For example, the network can treat the non-blocking period 115 of the first time frame 105A as a separate time frame and further divide that non-blocking period 115 into a shorter repetition period for a third coverage level and a shorter non-blocking period for the second coverage level. During the shorter repetition period, the network can communicate with a fourth wireless device in the third coverage level, where repetitions are anticipated. During the shorter non-blocking period, the network can communicate with the second device (and/or the third device) in the second coverage level.

Furthermore, although this example includes only one UE in a bad coverage area, this disclosure contemplates the network communicating with multiple UEs in bad coverage areas using multiple repetition periods in each time frame 105A, 105B, 105C, 105D. For example, the network can divide each time frame 105A, 105B, 105C, 105D to include two repetition periods to accommodate two UEs in bad coverage areas. The gap of each time frame 105A, 105B, 105C, 105D would follow the two repetition periods. This disclosure also contemplates the network communicating messages to multiple devices during the non-blocking period 115 of a time frame 105A, 105B, 105C, 105D.

Stated differently, this disclosure contemplates dividing each grid 105A, 105B, 105C, 105D (also referred to as grid design) in an NB-IoT downlink for PDSCH and/or PDCCH channels to include gaps in the grid for UEs with different coverage levels. Each gap corresponds to UEs in different coverage levels. If a gap does not correspond to a particular coverage level, then during that gap, that particular coverage level cannot receive downlink data or control information. The structure of the gaps is efficient in the way it provides enough resource within each grid 105A, 105B, 105C, 105D so that UEs with different coverage levels (different number of repetitions) can be supported for communication. The grid structure is designed such that it allows for the coexistence of gaps with possible PDCCH search space design as well as PDSCH transmissions scheduled by PDCCH for different coverage levels.

Although this disclosure describes repeated transmissions of a message to a UE, this disclosure contemplates that the repeated transmission can be of a message that is not identical in all respects to the originally transmitted message. For example, certain portions of the header of the repeat transmission may not be identical to corresponding portions of the header of the original transmission (e.g., certain counters and timestamps will be different). So long as the body of the messages are the same, the subsequent transmission is considered a repeat transmission. In other words, the message communicated to the first wireless device during the repetition period 110 of the first time frame 105A may have the same body but not the same header as the message communicated to the first wireless device during the repetition period 110 of the second time frame 105B.

Furthermore, although this disclosure describes communicating a message to a wireless device, it is understood that the message does not have to be received by the wireless device to be considered communicated to the wireless device. For example, the network may transmit a message repeatedly to a wireless device in a bad coverage area, but only one of those transmissions may be received by the wireless device. In this instance, every transmission of the message (including repeat transmissions) is considered communicating the message to the device even though every transmission is not received by the wireless device.

FIG. 2 illustrates an example transmission time 200 being divided into grids 205A, 205B, 205C that accommodate more than one device in extreme coverage. When multiple UEs are in extreme coverage, the grid 205 structure can be configured so that more than one UE with extreme coverage can be scheduled before each gap 220 as shown in FIG. 2. In this example, there are N=2 UEs in extreme coverage being scheduled at each grid 205, where their transmissions are divided into two different parts 210 and 215 with length T_tx. Different parts of the same UE may be sent in different grids 205. Inside each grid 205 after transmission of extreme coverage parts, there exists the gap 220 so that other UEs can be scheduled within this gap 220. Although this example shows only two UEs in extreme coverage, this disclosure contemplates that this idea can be extended to larger number of UEs in extreme coverage.

This disclosure also contemplates subdividing a repetition period and/or a non-blocking period to account for any number of coverage levels. FIG. 3 illustrates an example transmission time 300 that has been divided into grids 305A, 305B. These grids are divided into repetition period(s) and non-blocking period(s). These periods are then further divided to accommodate additional coverage levels. For example, grid 305A is first divided into two periods, a first period represented by 325 and a second period represented by combination of 310, 315, and 320. The second period is then divided into a third period represented by 320 and a fourth period represented by the combination of 310 and 315. The fourth period is then divided into a fifth period represented by 315 and a sixth period represented by 310. Each of these periods may be used to transmit messages to devices in different coverage levels.

In general, the grid 305 structure can also be extended to incorporate more than one coverage level. Inside each gap (e.g., the period represented by 310, 315, and 320), further gaps (e.g., the period represented by 310 and 315) for UEs in lower coverage levels can be defined. For each coverage level, the number of repetitions of PDCCH/PDSCH may be larger than the length of the gap, so more than one gap (e.g., the gap of a subsequent grid) may be needed to make the necessary number of repetitions; however the number of repetitions should not be larger than the threshold of the next coverage level, which in that case, they have to use the next coverage transmission time. As seen in FIG. 3, this results in certain periods being longer than others (e.g., period 320 is longer than period 315, and period 325 is longer than both period 315 and period 320). Therefore, to manage UEs' transmission inside each coverage level, the transmission of each level can be divided into different parts and is sent within different grids 305. This method is depicted in FIG. 3.

Based on this method, N different coverage levels are included and for each level, a specific gap area inside each grid is included. In the example depicted in FIG. 3, N=4. So UEs are classified in different coverage levels (also referred to as repetition levels). One way to specify coverage levels is by setting up different thresholds. However, there could be other criteria and this does not preclude other methods to classify different UEs in different coverage levels, and there is no necessity to set up a set of thresholds. If thresholds are set as the classification method, then for each level R_tx_thresh_k is set. If the number of transmissions that is needed to reach the specific UE coverage level is R_UE, and R_tx_thresh_k−1<R_UE<R_tx_thres_k, then the UE is within the coverage level k. For the first coverage level, the lower limit is zero and for the last coverage level the upper limit is R_max, which is the maximum possible number of repetitions.

Further, specific transmission time T_tx k and transmission gap T_gap k can be established for each level. As is also illustrated in FIG. 3, the gap and transmission time for each level is established inside the gaps of a higher level, because the subframes outside of the gaps of the higher level are used for transmission to UEs in higher coverage levels.

Because a UE does not know whether there is any PDCCH scheduled for the UE or the exact place of its scheduled PDCCH, there are specific subframe indices where the UE starts to blindly decode specific PDCCH configurations. Different PDCCH configurations can be specified by different parameters, for example different numbers of repetition levels and/or aggregation levels, in order to decode possible PDCCH. Based on the grid structure, the UE can be scheduled for PDCCH reception only in the transmission possibilities. To better support the coexistence of the starting subframe concept and grid design for gaps in downlink, this disclosure contemplates aligning transmission possibilities in the grid structure with the starting subframe occasions. This is shown in FIG. 3 as well.

In some embodiments, information regarding the configuration of the gaps is sent to the UE by Radio Resource Control (RRC) signaling with predefined configuration. This also gives the scheduler more configuration flexibility on the possibility of whether to use gaps structure for each PDSCH or PDCCH.

In one embodiment, downlink transmission is managed in grid structure to introduce gaps between repetitions of data and/or control transmission to UEs that need large number of repetitions. Other parts of the grid, which excludes the gap, can be used to transmit data and control information to UEs that are not allowed to receive any information during the gap and need a higher number of repetitions compared to UEs that are allowed to transmit during the gap.

During the gaps, the repetitions of downlink transmission for UEs with large number of repetitions are put on hold and UEs which needs few or no repetition can receive data in the downlink. After the gaps, transmissions to UEs with large number of repetitions (according to the threshold) are continued in the next grid.

In one embodiment, UEs are classified in different coverage levels (also referred to as repetition levels). One way to specify coverage levels is by setting up different thresholds. However, there could be other criteria and this does not preclude other methods to classify different UEs in different coverage levels and there is no necessity to set up any thresholds.

The grid structure includes different coverage levels. Each coverage level has its own gap. In case thresholds are applied as classification method, they are established for each coverage level so that UEs with a number of repetitions between each pair of consecutive thresholds belongs to the corresponding coverage level.

The largest gap is established for UEs with the largest number of repetitions, or last coverage class. The next largest gap is established for UEs with a number of repetitions lower than largest coverage level, but exceeds the number of repetitions in the lower coverage level. This process will be continued until a desired number of coverage levels is covered.

The gaps of lower coverage levels are defined within the gaps of higher coverage levels. If there is no data or control signaling being scheduled within the transmission period of each coverage level at each grid (the period within the grid that is not specified as the gap for that coverage level), then UEs with lower coverage levels can be scheduled to receive downlink data or control signaling during this period.

Figure 4A:
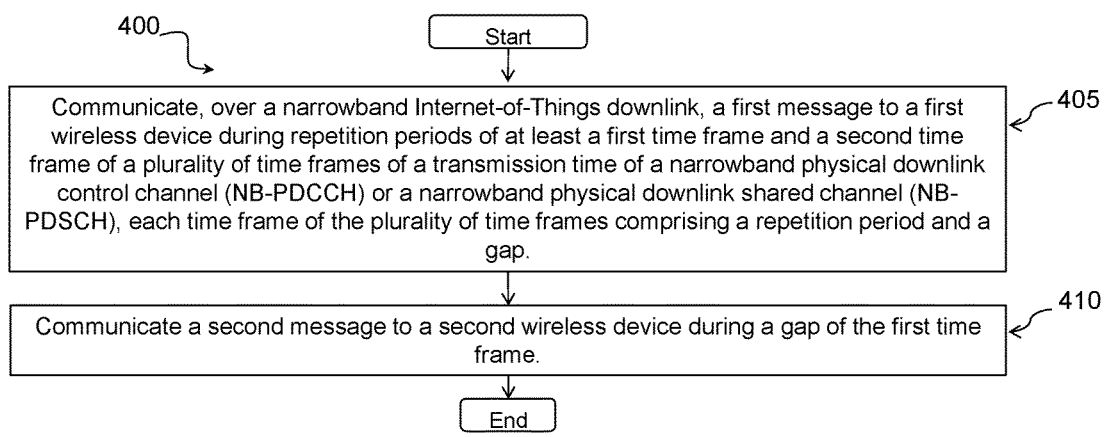
FIG. 4A is a flowchart illustrating an example method for allocating resources, in accordance with certain embodiments.

FIG. 4A is a flowchart illustrating an example method 400 for allocating resources, in accordance with certain embodiments. In particular embodiments, an access node (e.g., a network node and/or eNodeB) of a network, such as those described in FIGS. 6 and 10 performs method 400. By performing method 400, the access node may prevent UEs in bad or extreme coverage areas from blocking communications to UEs in good coverage areas.

The access node begins by communicating, over a narrowband Internet-of-Things downlink, a first message to a first wireless device during repetition periods of at least a first time frame and a second time frame of a plurality of time frames of a transmission time of a narrowband physical downlink control channel (NB-PDCCH) or a narrowband physical downlink shared channel (NB-PDSCH) in step 405. Each time frame of the plurality of time frames includes a repetition period and a gap. In step 410, the access node communicates a second message to a second wireless device during a gap of the first time frame. In some embodiments, the second message may be communicated after communicating the first message in the first time frame but before communicating the first message in the second time frame.

In certain embodiments, method 400 as described above may be performed by a computer networking virtual apparatus. FIG. 5 illustrates an example computer networking virtual apparatus 500 for performing method 400, according to certain embodiments. In certain embodiments, computer networking virtual apparatus 500 may include modules for performing steps similar to those described above with regard to the method illustrated and described in FIG. 4. For example, computer networking virtual apparatus 500 may include at least a communicating module 505, and any other suitable modules. In some embodiments, one or more of the modules may be implemented using processing circuitry 1020 of FIG. 10. In certain embodiments, the functions of two or more of the various modules may be combined into a single module. Computer networking virtual apparatus may be a network node, such as an eNodeB.

The communicating module 505 may perform the communicating functions of computer networking virtual apparatus 500. For example, communicating module 505 may communicate a first message to a first wireless device during repetition periods of at least a first time frame and a second time frame of a plurality of time frames and/or communicate a second message to a second wireless device during a gap of the first time frame.

Figure 4B:
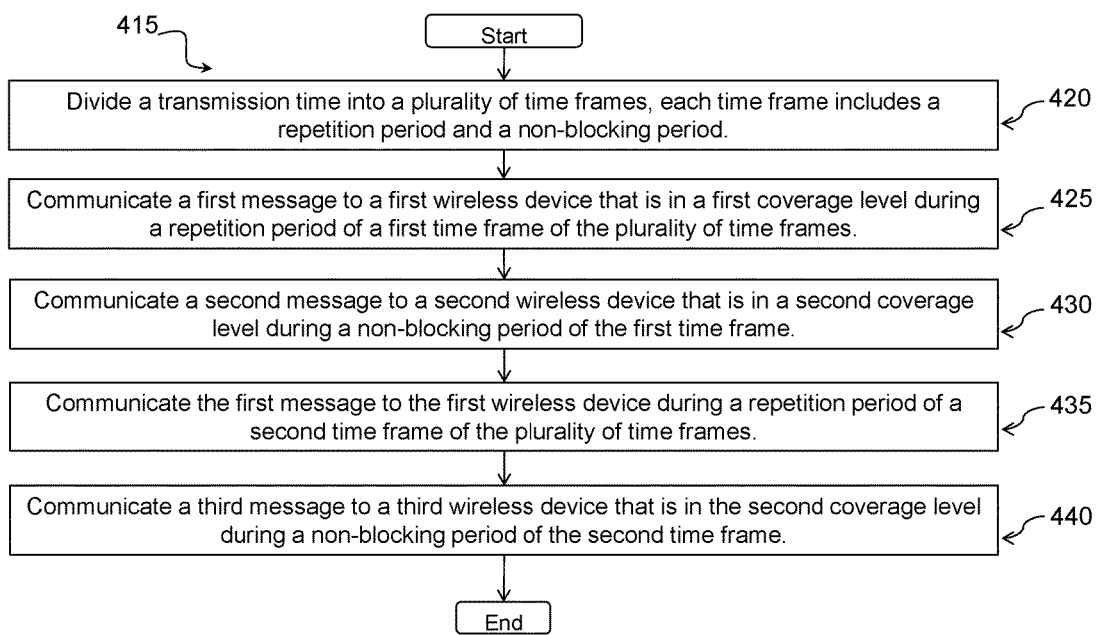
FIG. 4B is a flowchart illustrating an example method for allocating resources, in accordance with certain embodiments.
Figure 5:
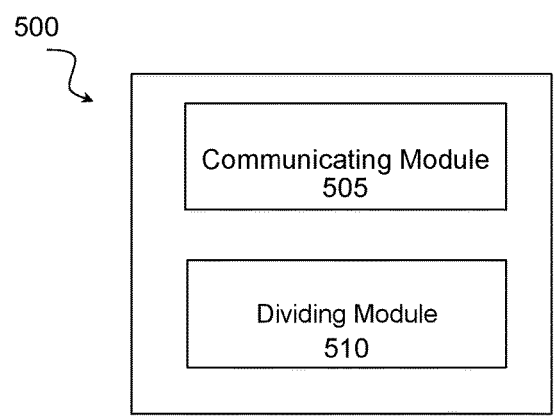
FIG. 5 is a block diagram illustrating a computer networking virtual apparatus, according to certain embodiments.

FIG. 4B is a flowchart illustrating an example method 415 for allocating resources, in accordance with certain embodiments. In particular embodiments, an access node (e.g., an eNodeB) of a network, such as those described in FIGS. 6 and 10 perform method 415. By performing method 415, the access node may prevent UEs in bad or extreme coverage areas from blocking communications to UEs in good coverage areas.

The access node begins by dividing a transmission time into a plurality of time frames, each time frame including a repetition period and a non-blocking period in step 420. This disclosure contemplates that the dividing step (step 420) is not essential. The access node then communicates a first message to a first wireless device that is in a first coverage level during a repetition period of a first time frame of the plurality of time frames in step 425. In step 430, the access node communicates a second message to a second wireless device that is in a second coverage level during a non-blocking period of the first time frame. The access node then communicates the first message to the first wireless device during a repetition period of a second time frame of the plurality of time frames in step 435. In step 440, the access node communicates a third message to a third wireless device that is in the second coverage level during a non-blocking period of the second time frame.

In certain embodiments, method 415 as described above may be performed by the computer networking virtual apparatus 500 of FIG. 5. Computer networking virtual apparatus 500 may include additional modules for performing steps similar to those described above with regard to the method illustrated and described in FIG. 4B. For example, computer networking virtual apparatus 500 may include at least one dividing module 510 and any other suitable modules. In some embodiments, one or more of the modules may be implemented using one or more processors 1020 of FIG. 10. In certain embodiments, the functions of two or more of the various modules may be combined into a single module.

The dividing module 510 may perform the dividing functions of computer networking virtual apparatus 500. For example, the dividing module 510 may divide a transmission time into a plurality of time frames, each time frame includes a repetition period and a non-blocking period.

The communicating module 505 may perform the communicating functions of computer networking virtual apparatus 500. For example, the communicating module may communicate a first message to a first wireless device that is in a first coverage level during a repetition period of a first time frame of the plurality of time frames, communicate a second message to a second wireless device that is in a second coverage level during a non-blocking period of the first time frame, communicate the first message to the first wireless device during a repetition period of a second time frame of the plurality of time frames, and/or communicate a third message to a third wireless device that is in the second coverage level during a non-blocking period of the second time frame.

Other embodiments of computer networking virtual apparatus 500 may include additional components beyond those shown in FIG. 5 that may be responsible for providing certain aspects of the network functionality, including any of the functionality described above and/or any additional functionality (including any functionality necessary to support the solutions described above). The various different types of network devices may include components having the same physical hardware but configured (e.g., via programming) to support different radio access technologies, or may represent partly or entirely different physical components.

Figure 6:
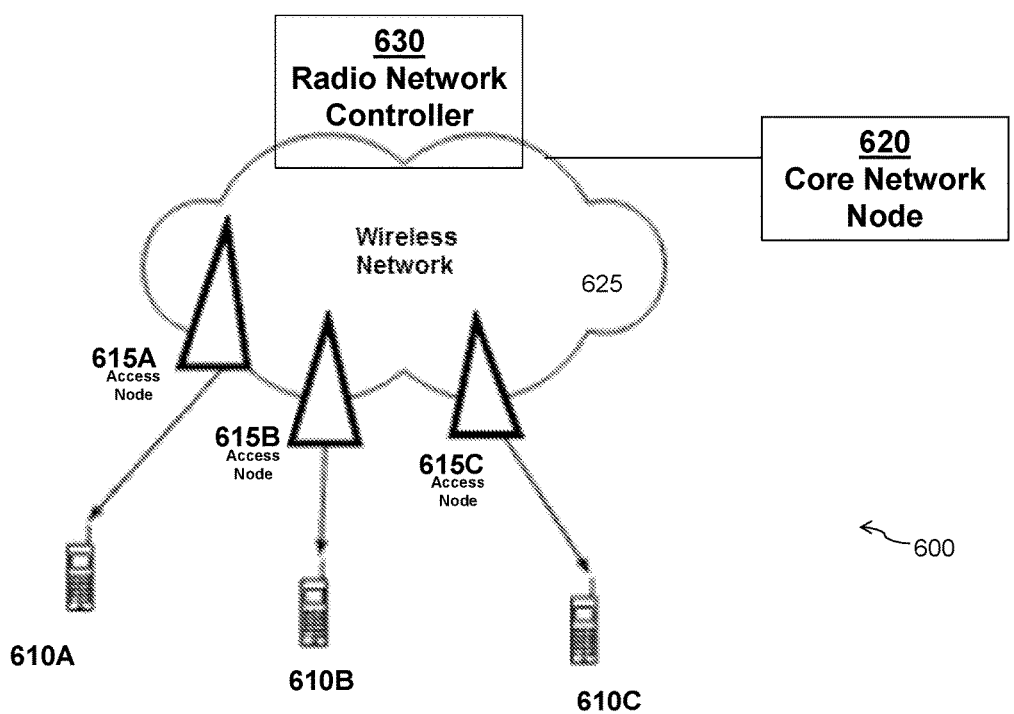
FIG. 6 illustrates an example network, in accordance with certain embodiments.
Figure 7:
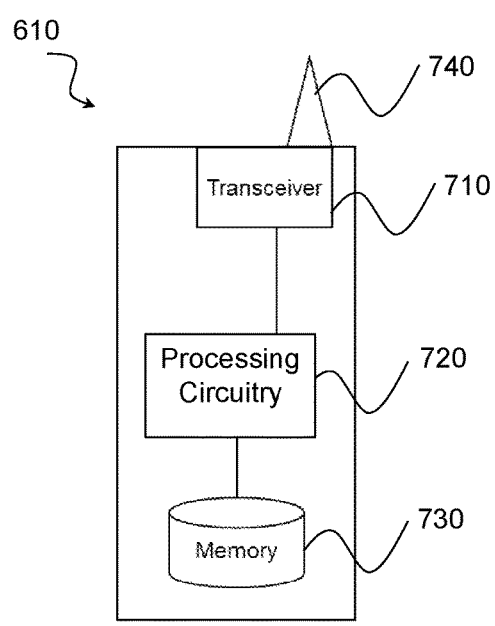
FIG. 7 is a block schematic of an example wireless device, in accordance with certain embodiments.
Figure 10:
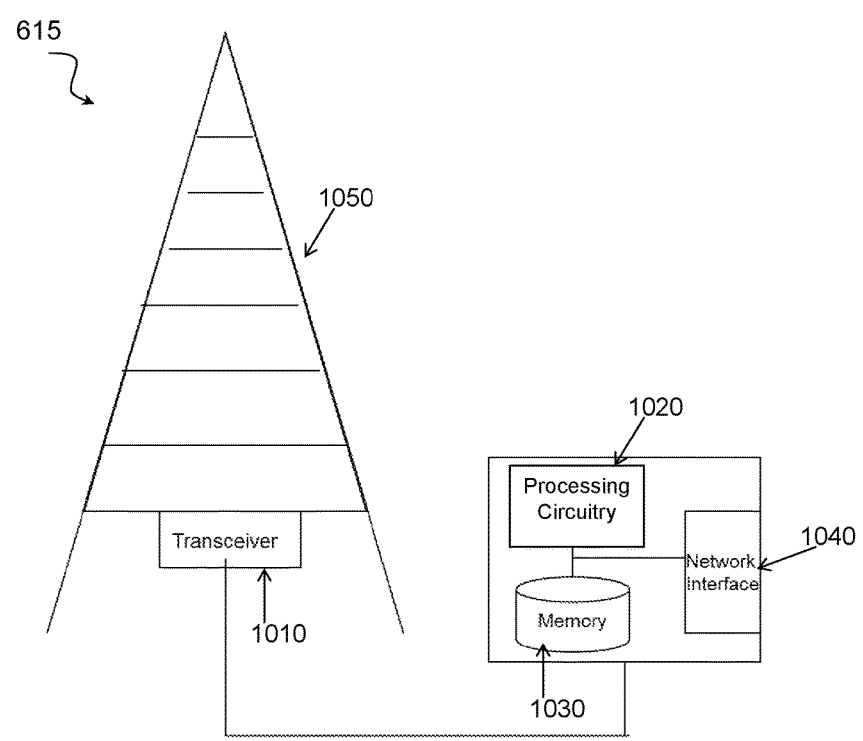
FIG. 10 is a block schematic of an example radio network node, in accordance with certain embodiments.

This disclosure contemplates any of the described features being implemented in a network as described in FIG. 6, a wireless device as described in FIG. 7, and/or a radio network node as described in FIG. 10.

FIG. 6 illustrates an example network 600, according to certain embodiments. Network 600 includes one or more wireless devices 610A-C, which may be interchangeably referred to as wireless devices 610 or UEs 610, and network nodes 615A-C, which may be interchangeably referred to as network nodes 615, access nodes (AN) 615, or eNodeBs 615, and a core network node 620. A wireless device 610 may communicate with network nodes 615 over a wireless interface. For example, wireless device 610A may transmit wireless signals to one or more of network nodes 615, and/or receive wireless signals from one or more of network nodes 615. The wireless signals may contain voice traffic, data traffic, control signals, and/or any other suitable information. In some embodiments, an area of wireless signal coverage associated with a network node 615 may be referred to as a cell. For example, wireless device 610 may receive control signals from network node 615 indicating grid structure and in which gap the wireless may expect to receive transmissions from network node 615. In some embodiments, wireless devices 610 may have D2D capability. Thus, wireless devices 610 may be able to receive signals from and/or transmit signals directly to another wireless device 610. For example, wireless device 610A may be able to receive signals from and/or transmit signals to wireless device 610B.

Core network node 620 may manage the establishment of communication sessions and provide various other functionality for wireless communication device 610. Wireless communication device 610 exchanges certain signals with core network node 620 using the non-access stratum layer. In non-access stratum (NAS) signaling, signals between wireless communication device 610 and core network node 620 pass transparently through network nodes 615.

As described above, example embodiments of network 600 may include one or more wireless devices 610, and one or more different types of network nodes capable of communicating (directly or indirectly) with wireless devices 610. Wireless device 610 may refer to any type of wireless device communicating with a node and/or with another wireless device in a cellular or mobile communication system. Examples of wireless device 610 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB (universal serial bus) dongles, a D2D (device-to-device) capable device, an NB-IoT device, or another device that can provide wireless communication. A wireless device 610 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU (remote radio unit), RRH (remote radio head), nodes in distributed antenna system (DAS), core network node (e.g. MSC, MME etc.), O&M (operations and maintenance), OSS (e.g., object storage server), SON (self-organizing network), positioning node (e.g. E-SMLC), MDT, or any suitable network node. Each of wireless communication device 610, network node 615, and core network node 620 include any suitable combination of hardware and/or software. Example embodiments of wireless devices 610 and network nodes 615 are described in more detail with respect to FIGS. 7 and 10, respectively.

In certain embodiments, network nodes 615 may interface with a radio network controller 630. Radio network controller 630 may control network nodes 615 and may provide certain radio resource management functions, mobility management functions, and/or other suitable functions. In certain embodiments, radio network controller 630 may interface with core network node 620 via an interconnecting network 625. The interconnecting network 625 may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Although FIG. 6 illustrates a particular arrangement of network 600, the present disclosure contemplates that the various embodiments described herein may be applied to a variety of networks having any suitable configuration. For example, network 600 may include any suitable number of wireless devices 610 and network nodes 615, as well as any additional elements suitable to support communication between wireless devices or between a wireless device and another communication device (such as a landline telephone). In certain embodiments, wireless communication device 610, network node 615, and core network node 620 use any suitable radio access technology, such as long term evolution (LTE), LTE-Advanced, UMTS (universal mobile telecommunications service), HSPA (high speed packet access), GSM (global system for mobile communication), cdma2000, WiMax, WiFi, another suitable radio access technology, or any suitable combination of one or more radio access technologies. For purposes of example, various embodiments may be described within the context of certain radio access technologies. However, the scope of the disclosure is not limited to the examples and other embodiments could use different radio access technologies.

FIG. 7 is a block schematic of an example wireless device 610, in accordance with certain embodiments. Wireless device 610 may refer to any type of wireless device communicating with a node and/or with another wireless device in a cellular or mobile communication system. Examples of wireless device 610 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, an NB-IoT device, or another device that can provide wireless communication. A wireless device 610 may also be referred to as user equipment (UE), a station (STA), a device, or a terminal in some embodiments. In accordance with embodiments of the present disclosure, the UE may be inside, integrated into, or otherwise attached to a vehicle.

Wireless device 610 includes transceiver 710, processing circuitry 720, memory 730, and antenna 740. In some embodiments, transceiver 710 facilitates transmitting wireless signals to and receiving wireless signals from a network node (e.g., via antenna 740), processing circuitry 720 executes instructions to provide some or all of the functionality described above as being provided by wireless device 610, and memory 730 stores the instructions executed by processing circuitry 720.

Processing circuitry 720 may include any suitable combination of hardware and/or software implemented in one or more modules to execute instructions and manipulate data to perform some or all of the described functions of wireless device 610. In some embodiments, processing circuitry 720 may include, for example, one or more computers, one or more central processing units (CPUs), one or more microprocessors, one or more applications, and/or other logic. Processing circuitry 720 may receive and process messages received from a network node. For example, processing circuitry 720 may process a control message from a network node to determine grid structure and when wireless device 610 can expect transmissions from the network node.

Memory 730 is generally operable to store instructions, such as a computer program, software, an application including one or more of logic, rules, algorithms, code, tables, etc. and/or other instructions capable of being executed by processing circuitry 720. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information. It is contemplated that processing circuitry 720 and memory 730 may be configured to perform any of the functions of a UE described herein.

The illustrated wireless device may represent communication devices that include any suitable combination of hardware and/or software. Other embodiments of wireless device 610 may include additional components beyond those shown in FIG. 7 that may be responsible for providing certain aspects of the wireless device's functionality, including any of the functionality described above and/or any additional functionality (including any functionality necessary to support the solution described above). In particular embodiments, some or all of the functionality described above as being provided by UEs and/or any other types of wireless communication devices, may be provided by processing circuitry 720 executing instructions stored on a computer-readable medium, such as memory 730. In particular embodiments, some or all of the functionality described above as being provided by mobile communication devices or other forms of UE may be provided by UE processing circuitry 720 executing instructions stored on a computer-readable medium, such as memory 730 shown in FIG. 7.

Figure 8:
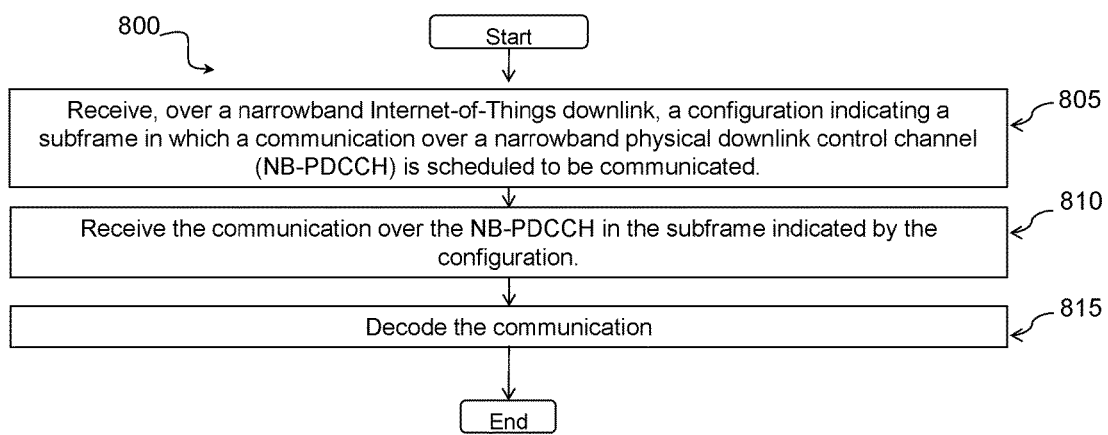
FIG. 8 is a flowchart illustrating a method for allocating resources, in accordance with certain embodiments.

FIG. 8 is a flowchart illustrating a method 800 for allocating resources, in accordance with certain embodiments. In certain embodiments, wireless device 610 performs method 800. By performing method 800, wireless device 610 may avoid blocking transmissions intended for other wireless devices 610 on the network. Additionally, wireless device 610 may avoid having its messages and transmissions blocked by other wireless devices 610 on the network.

Wireless device 610 may begin by receiving, over a narrowband Internet of Things downlink, a configuration indicating a subframe in which a communication over a narrowband physical downlink control channel (NB-PDCCH) is scheduled to be communicated in step 805. In step 810, wireless device 610 receives the communication over the NB-PDCCH in the subframe indicated by the configuration. Then, in step 815, wireless device 610 decodes the communication.

Figure 9:
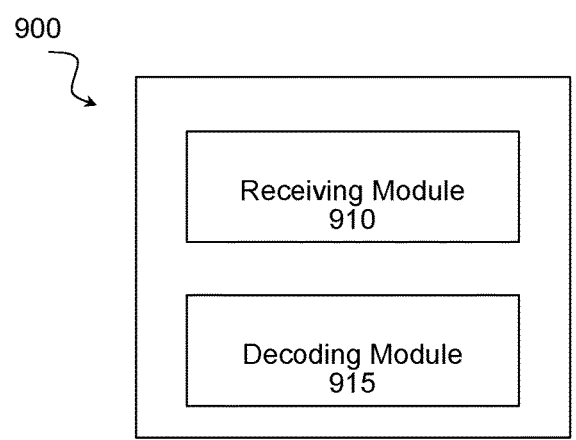
FIG. 9 is a block diagram illustrating a computer networking virtual apparatus, according to certain embodiments.

In certain embodiments, method 800 as described above may be performed by a computer networking virtual apparatus. FIG. 9 illustrates an example computer networking virtual apparatus 900 for performing method 800, according to certain embodiments. In certain embodiments, virtual computing device 900 may include modules for performing steps similar to those described above with regard to the method illustrated and described in FIG. 8. For example, computer networking virtual apparatus 900 may include at least a receiving module 910, a decoding module 915, and any other suitable modules. In some embodiments, one or more of the modules may be implemented using processing circuitry 720 of FIG. 7. In certain embodiments, the functions of two or more of the various modules may be combined into a single module. Computer networking virtual apparatus may be a wireless device 610 or implemented in wireless device 610.

The receiving module 910 may perform the receiving functions of computer networking virtual apparatus 900. For example, receiving module 910 may receive a configuration indicating a subframe and receive a communication over the NB-PDCCH in the subframe. The decoding module 915 may decode the communication.

Other embodiments of computer networking virtual apparatus 900 may include additional components beyond those shown in FIG. 9 that may be responsible for providing certain aspects of the network functionality, including any of the functionality described above and/or any additional functionality (including any functionality necessary to support the solutions described above). The various different types of network devices may include components having the same physical hardware but configured (e.g., via programming) to support different radio access technologies, or may represent partly or entirely different physical components.

FIG. 10 is a block schematic of an example network node 615, in accordance with certain embodiments. Network node 615 may be any type of radio network node or any network node that communicates with a UE and/or with another network node. Examples of network node 615 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 615 may be deployed throughout a network as a homogenous deployment, heterogeneous deployment, or mixed deployment. A homogeneous deployment may generally describe a deployment made up of the same (or similar) type of network nodes 615 and/or similar coverage and cell sizes and inter-site distances. A heterogeneous deployment may generally describe deployments using a variety of types of network nodes 615 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 615 may include one or more of transceiver 1010, processing circuitry 1020, memory 1030, network interface 1040, and antenna 1050. In some embodiments, transceiver 1010 facilitates transmitting wireless signals to and receiving wireless signals from wireless device 610 (e.g., via antenna 1050), processing circuitry 1020 executes instructions to provide some or all of the functionality described above as being provided by a network node 615, memory 1030 stores the instructions executed by processing circuitry 1020, and network interface 1040 communicates signals to backend network components, such as a gateway, switch, router, Internet, Public Switched Telephone Network (PSTN), core network nodes or radio network controllers, etc. In some embodiments, processing circuitry 1020 divides a transmission time into repetition and non-blocking periods. Processing circuitry 1020 also communicates messages and/or schedules messages to be communicated to different UEs during the repetition and non-blocking periods.

Network node 615 may be configured to perform the functions described herein. For example, network node 615 may be configured to divide a transmission time into time frames or grids. Network node 615 may further divide each grid into a repetition period and a non-blocking period. During the repetition period, network node 615 may communicate messages to wireless devices in a poor or extreme coverage level (e.g., many repeated transmissions are needed to reach these devices). During the non-blocking period, network node 615 may communicate messages to wireless devices in good coverage levels (e.g., no or few repeated transmissions are needed to reach these devices). Network node 615 may further subdivide a repetition period of non-blocking period to account for additional coverage levels. In this manner, repeat transmissions that may be needed to reach devices in poor coverage levels may not delay or block transmission to devices in good or better coverage levels. Network node 615 may assign a UE to a particular coverage level based on any appropriate measure. For example, network node 615 may assign a UE to a particular coverage level based on a number of transmissions it takes to reach the UE. Network node 615 may define coverage levels using thresholds for the number of transmissions it takes to reach a UE (e.g., each coverage level may be defined by a lower threshold and an upper threshold). If the number of transmissions it takes to reach a particular UE exceeds the upper threshold or falls below the lower threshold for a coverage level, then the network node may assign that UE to a poorer or better coverage level respectively. In this manner, network node 615 may assign a UE to a poorer coverage level if it takes more repeated transmissions to reach the UE. For example, a first UE may be assigned to a poorer coverage level than a second UE if more repeated transmissions are needed to reach the first UE than the second UE.

Processing circuitry 1020 may include any suitable combination of hardware and software implemented in one or more modules to execute instructions and manipulate data to perform some or all of the described functions of network node 615. In some embodiments, processing circuitry 1020 may include, for example, one or more computers, one or more central processing units (CPUs), one or more microprocessors, one or more applications, and/or other logic. Processing circuitry 1020 may perform the functions of network node 615 described herein. For example, processing circuitry 1020 may divide a transmission time into one or more repetition periods and one or more non-blocking periods. Processing circuitry 1020 may determine in which period (repetition or non-blocking) a transmission to a wireless device should be made. Processing circuitry 1020 may also determine in which coverage level a particular device is and transmit messages to that wireless device as described herein. Processing circuitry 1020 may also detect a number of transmissions it takes to reach a wireless device and assign the wireless device to a particular coverage level according to that detected number.

Memory 1030 is generally operable to store instructions, such as a computer program, software, an application including one or more of logic, rules, algorithms, code, tables, etc. and/or other instructions capable of being executed by processing circuitry 1020. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processing circuitry 1020 and may refer to any suitable device operable to receive input for network node 615, send output from network node 615, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

In certain embodiments, network node 615 may include a communicating module and any other suitable modules. In some embodiments, one or more of the communicating module or any other suitable module may be implemented using processing circuitry 1020 of FIG. 10. In certain embodiments, the functions of two or more of the various modules may be combined into a single module. The communicating module may perform the transmission functions of network node 615. The communicating module may transmit messages to one or more of wireless devices 610. In particular embodiments, the communicating module may receive at a receiving module messages and/or signals for transmission. The receiving module may perform the receiving functions of network node 615. The receiving module may receive any suitable information from a wireless device. The receiving module may include a receiver and/or a transceiver. The receiving module may include circuitry configured to wirelessly receive messages and/or signals. In particular embodiments, the receiving module may communicate received messages and/or signals to any suitable module.

The illustrated network node 615 of FIG. 10 may represent network nodes that include any suitable combination of hardware and/or software. Other embodiments of network node 615 may include additional components beyond those shown in FIG. 10 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. In particular embodiments, some or all of the functionality described above as being provided by a network node 615 may be provided by the node processing circuitry 1020 executing instructions stored on a computer-readable medium, such as memory 1030 shown in FIG. 10.

Figure 11:
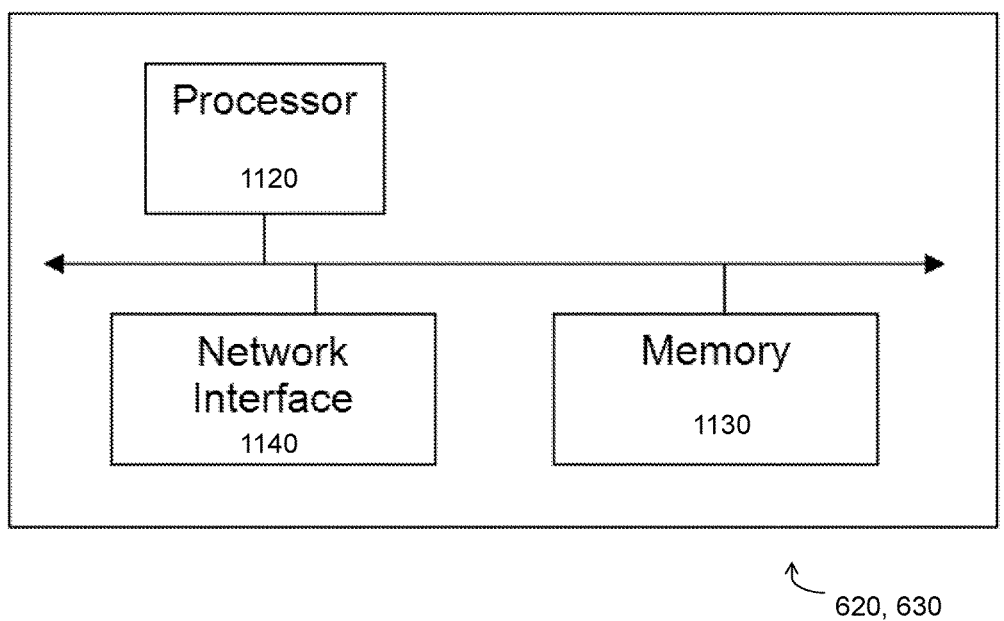
FIG. 11 is a block schematic of an exemplary radio network controller or core network node, in accordance with certain embodiments.

FIG. 11 is a block schematic of an exemplary radio network controller 630 or core network node 620, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller 630 or core network node 620 includes processor 1120, memory 1130, and network interface 1140. In some embodiments, processor 1120 executes instructions to provide some or all of the functionality described above as being provided by the network node, memory 1130 stores the instructions executed by processor 1120, and network interface 1140 communicates signals to any suitable node, such as a gateway, switch, router, Internet, Public Switched Telephone Network (PSTN), network nodes 615, radio network controllers 630 or core network nodes 620, etc.

Processor 1120 may include any suitable combination of hardware and software implemented in one or more modules to execute instructions and manipulate data to perform some or all of the described functions of the radio network controller 630 or core network node 620. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including any functionality necessary to support the solution described above).

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods disclosed herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The following abbreviations may be used:
3GPP 3$^{rd}$ Generation Partnership Project
DL Downlink
IoT Internet of Things
LTE Long Term Evolution
MPDCCH MTC-PDCCH
MTC Machine-type communication
NB IoT Narrowband Internet of Things
NB-PDCCH NB-IoT PDCCH
NB-PDSCH NB-IoT PDSCH
PDCCH Physical downlink control channel
PDSCH Physical downlink shared channel
RRC Radio Resource Control
UE User Equipment
eNB enhanced Node B

What is claimed is:

1. A method in a network node comprising:
communicating, over a narrowband Internet of Things downlink, a first message to a first wireless device during repetition periods of at least a first subframe and a second subframe of a plurality of subframes of a transmission time of a narrowband physical downlink control channel (NB-PDCCH) or a narrowband physical downlink shared channel (NB-PDSCH), each subframe of the plurality of subframes comprising a repetition period and a gap; and
communicating a second message to a second wireless device during a gap of the first subframe.

2. The method of claim 1, further comprising communicating a third message to a third wireless device during a gap of the second subframe.

3. The method of claim 2, further comprising:
communicating a fourth message to a fourth wireless device during a second repetition period of the first subframe; and
communicating the fourth message to the fourth wireless device during a second repetition period of the second subframe.

4. The method of claim 1, further comprising communicating a third message to a third wireless device during the repetition period of the first subframe.

5. The method of claim 1, further comprising communicating a third message to a third wireless device during the gap of the first subframe.

6. The method of claim 5, wherein:
the repetition period of the first subframe comprises a first period and a second period, the first period is longer than the second period;
the first message is communicated during the first period; and
the third message is communicated during the second period.

7. The method of claim 5, further comprising communicating a fourth message to a fourth wireless device during the repetition period of the first subframe.

8. The method of claim 7, wherein:
the repetition period of the first subframe comprises a first period, a second period, and a third period, the first period is longer than the second period, the second period is longer than the third period;
the first message is communicated during the first period;
the third message is communicated during the second period; and
the fourth message is communicated during the third period.

9. The method of claim 1, wherein the method is performed at an eNodeB.

10. The method of claim 1, further comprising assigning the first wireless device to a coverage level based on a number of repeated transmissions communicated before an acknowledgment is received from the first wireless device.

11. The method of claim 1, wherein a number of repeated transmissions to reach the first wireless device is greater than a number of repeated transmissions to reach the second wireless device.

12. The method of claim 1, wherein the first subframe and the second subframe are consecutive subframes within the plurality of subframes.

13. A network node comprising:
a memory; and
processing circuitry communicatively coupled to the memory, the processing circuitry configured to:
communicate, over a narrowband Internet of Things downlink, a first message to a first wireless device during repetition periods of at least a first subframe and a second subframe of a plurality of subframes of a transmission time of a narrowband physical downlink control channel (NB-PDCCH) or a narrowband physical downlink shared channel (NB-PDSCH), each subframe of the plurality of subframes comprising a repetition period and a gap; and
communicate a second message to a second wireless device during a gap of the first subframe.

14. The network node of claim 13, wherein the processing circuitry is further configured to communicate a third message to a third wireless device during a gap of the second subframe.

15. The network node of claim 14, wherein the processing circuitry is further configured to:
communicate a fourth message to a fourth wireless device during a second repetition period of the first subframe; and
communicate the fourth message to the fourth wireless device during a second repetition period of the second subframe.

16. The network node of claim 13, wherein the processing circuitry is further configured to communicate a third message to a third wireless device during the repetition period of the first subframe.

17. The network node of claim 13, wherein the processing circuitry is further configured to communicate a third message to a third wireless device during the gap of the first subframe.

18. The network node of claim 17, wherein:
the repetition period of the first subframe comprises a first period and a second period, the first period is longer than the second period;
the first message is communicated during the first period; and
the third message is communicated during the second period.

19. The network node of claim 17, wherein the processing circuitry is further configured to communicate a fourth message to a fourth wireless device during the repetition period of the first subframe.

20. The network node of claim 19, wherein:
the repetition period of the first subframe comprises a first period, a second period, and a third period, the first period is longer than the second period, the second period is longer than the third period;
the first message is communicated during the first period;
the third message is communicated during the second period; and
the fourth message is communicated during the third period.

21. The network node of claim 13, wherein the network node is an eNodeB.

22. The network node of claim 13, wherein the first wireless device is assigned to a coverage level based on a number of repeated transmissions communicated before an acknowledgment is received from the first wireless device.

23. The network node of claim 13, wherein a number of repeated transmissions to reach the first wireless device is greater than a number of repeated transmissions to reach the second wireless device.

24. The network node of claim 13, wherein the first subframe and the second subframe are consecutive subframes within the plurality of subframes.

25. A wireless device comprising:
a memory; and
processing circuitry communicatively coupled to the memory, the processing circuitry configured to:
receive, over a narrowband Internet of Things downlink, a configuration indicating a subframe in which a communication over a narrowband physical downlink control channel (NB-PDCCH) is scheduled to be communicated;
receive the communication over the NB-PDCCH in the subframe indicated by the configuration; and
decode the communication, and
wherein the wireless device is assigned to a coverage level based on a number of repeated transmissions communicated before the wireless device communicates an acknowledgment.

26. The wireless device of claim 25, wherein the processing circuitry is further configured to receive a message during a repetition period of a first time frame of a plurality of time frames of a transmission time of a narrowband physical downlink control channel (NB-PDCCH) or the NB-PDSCH, each time frame of the plurality of time frames comprising a repetition period and a gap.

27. The wireless device of claim 26, wherein at least a time frame of the plurality of time frames is aligned with the subframe.

28. The wireless device of claim 26, wherein the processing circuitry is further configured to receive a message during a gap of a first time frame of a plurality of time frames of a transmission time of a narrowband physical downlink control channel (NB-PDCCH) or a narrowband physical downlink shared channel (NB-PDSCH), each time frame of the plurality of time frames comprising a repetition period and a gap.

29. The wireless device of claim 25, wherein the configuration is communicated by an eNodeB.

30. The wireless device of claim 25, wherein a number of repeated transmissions to reach the wireless device is greater than a number of repeated transmissions to reach a second wireless device assigned to a different coverage level than the wireless device.

31. A method comprising:
receiving, over a narrowband Internet of Things downlink, a configuration indicating a subframe in which a communication over a narrowband physical downlink control channel (NB-PDCCH) is scheduled to be communicated;
receiving the communication over the NB-PDCCH in the subframe indicated by the configuration; and
decoding the communication, and
wherein a wireless device that receives the configuration is assigned to a coverage level based on a number of repeated transmissions communicated before the wireless device communicates an acknowledgment.

32. The method of claim 31, further comprising receiving a message during a repetition period of a first time frame of a plurality of time frames of a transmission time of a narrowband physical downlink control channel (NB-PDCCH) or the NB-PDSCH, each time frame of the plurality of time frames comprising a repetition period and a gap.

33. The method of claim 32, wherein at least a time frame of the plurality of time frames is aligned with the subframe.

34. The method of claim 32, wherein the processing circuitry is further configured to receive a message during a gap of a first time frame a plurality of time frames of a transmission time of a narrowband physical downlink control channel (NB-PDCCH) or a narrowband physical downlink shared channel (NB-PDSCH), each time frame of the plurality of time frames comprising a repetition period and a gap.

35. The method of claim 31, wherein the configuration is communicated by an eNodeB.

36. The method of claim 31, wherein a number of repeated transmissions to reach a wireless device that received the configuration is greater than a number of repeated transmissions to reach a second wireless device assigned to a different coverage level than the wireless device.

* * * * *

UNITED STATES PATENT AND TRADEMARK OFFICE
CERTIFICATE OF CORRECTION

PATENT NO. : 10,251,180 B2
APPLICATION NO. : 15/524798
DATED : April 2, 2019
INVENTOR(S) : Shokri Razaghi et al.

Page 1 of 1

It is certified that error appears in the above-identified patent and that said Letters Patent is hereby corrected as shown below:

In the Specification

In Column 1, Line 45, delete "Metting" and insert -- Meeting --, therefor.

In Column 8, Line 10, delete "T_tx k" and insert -- T_tx_k --, therefor.

In Column 8, Line 11, delete "T_gap k" and insert -- T_gap_k --, therefor.

Signed and Sealed this
Twentieth Day of August, 2019

Andrei Iancu
*Director of the United States Patent and Trademark Office*